United States Patent
Stahl et al.

(10) Patent No.: US 9,385,881 B2
(45) Date of Patent: Jul. 5, 2016

(54) MEDIA ACCESS CONTROL PROTOCOL DATA UNIT AGGREGATION IN A TIME DIVISION MULTIPLE ACCESS MEDIA ACCESS CONTROL LAYER

(75) Inventors: Thomas Anthony Stahl, Indianapolis, IN (US); Qingjiang Tian, West Lafayette, IN (US); Robert Andrew Rhodes, Carmel, IN (US); Rodger Anthony Diemer, Indianapolis, IN (US)

(73) Assignee: Thomson Licensing, Boulogne-Billancourt (FR)

(*) Notice: Subject to any disclaimer, the term of this patent is extended or adjusted under 35 U.S.C. 154(b) by 1161 days.

(21) Appl. No.: 12/312,793

(22) PCT Filed: Dec. 15, 2006

(86) PCT No.: PCT/US2006/047942
§ 371 (c)(1),
(2), (4) Date: May 26, 2009

(87) PCT Pub. No.: WO2008/073106
PCT Pub. Date: Jun. 19, 2008

(65) Prior Publication Data
US 2010/0091759 A1    Apr. 15, 2010

(51) Int. Cl.
*H04L 12/28* (2006.01)
*H04L 29/06* (2006.01)

(52) U.S. Cl.
CPC ............ *H04L 12/2832* (2013.01); *H04L 69/22* (2013.01); *H04L 65/4076* (2013.01); *H04L 2012/2841* (2013.01); *H04L 2012/2849* (2013.01)

(58) Field of Classification Search
CPC ....... H04L 69/22; H04L 1/004; H04L 1/0041; H04L 1/0045; H04W 74/04; H04W 28/06; H04W 28/065; H04W 72/042

USPC .......................................... 370/347; 709/236
See application file for complete search history.

(56) References Cited

U.S. PATENT DOCUMENTS 6,393,489 B1     5/2002  Sambamurthy et al.
6,970,940 B1 *  11/2005  Vogel et al. ................... 709/236
(Continued)

FOREIGN PATENT DOCUMENTS

EP      1345382 A2     9/2003
EP      1560344        8/2005
(Continued)

OTHER PUBLICATIONS

Page, M., "SuperMAC Protocol Specification", version 2.11, http://www.sonyoxford.co.uk/pub/dmap/download/SuperMAC-spec-current.pdf, archived Jun. 15, 2004.*
(Continued)

*Primary Examiner* — Scott M Sciacca
(74) *Attorney, Agent, or Firm* — Brian J. Dorini; Jerome G. Schaefer

(57) ABSTRACT

A method and apparatus are described for creating a multi-media stream (e.g., video, voice, audio, etc. . . . ) Super-MAC frame in a physical protocol data unit, including inserting a physical layer header into a channel time allocation and generating the multi-media stream SuperMAC frame further including, appending a media access control header after the physical layer header, calculating a header correction code, appending the header correction code after the media access control header, appending a media access control multi-media stream payload from a transmit queue, calculating a frame check sequence, appending the frame check sequence after the media access control multi-media stream payload and repeating the above acts, after inserting the physical layer header, until one of the channel time allocation is full or all transmit queues are empty.

5 Claims, 13 Drawing Sheets

(56) References Cited

U.S. PATENT DOCUMENTS

| | | | |
|---|---|---|---|
| 7,499,500 B2 * | 3/2009 | Page | 375/295 |
| 7,555,016 B2 * | 6/2009 | Page | 370/509 |
| 7,672,414 B2 * | 3/2010 | Page | 375/355 |
| 7,817,650 B2 * | 10/2010 | Page | 370/411 |
| 7,912,045 B2 * | 3/2011 | Page | 370/389 |
| 2003/0058870 A1 | 3/2003 | Mizrachi et al. | |
| 2003/0063619 A1 | 4/2003 | Montano et al. | |
| 2003/0152059 A1 * | 8/2003 | Odman | H04B 1/69 370/338 |
| 2003/0210673 A1 | 11/2003 | Nishimura | |
| 2004/0072573 A1 * | 4/2004 | Shvodian | 455/450 |
| 2004/0111663 A1 * | 6/2004 | Lewis | H03M 13/03 714/776 |
| 2004/0139244 A1 | 7/2004 | Hufferd | |
| 2004/0170121 A1 * | 9/2004 | Kim et al. | 370/208 |
| 2004/0218683 A1 * | 11/2004 | Batra et al. | 375/261 |
| 2004/0258092 A1 * | 12/2004 | Sugaya | 370/474 |
| 2005/0013267 A1 | 1/2005 | An | |
| 2005/0068895 A1 * | 3/2005 | Stephens et al. | 370/235 |
| 2005/0157715 A1 * | 7/2005 | Hiddink | H04L 1/0007 370/389 |
| 2005/0165950 A1 * | 7/2005 | Takagi et al. | 709/236 |
| 2005/0204250 A1 * | 9/2005 | Hong | H04L 12/64 714/748 |
| 2005/0286451 A1 * | 12/2005 | Kim et al. | 370/310 |
| 2006/0188003 A1 * | 8/2006 | Larsson | 375/130 |
| 2006/0274754 A1 * | 12/2006 | Cho et al. | 370/392 |
| 2007/0211758 A1 * | 9/2007 | Aarnio | H04L 1/0045 370/469 |
| 2008/0170533 A1 * | 7/2008 | Cyzs | H04B 5/02 370/315 |
| 2009/0063936 A1 * | 3/2009 | Kanda et al. | 714/776 |

FOREIGN PATENT DOCUMENTS

| | | |
|---|---|---|
| JP | 2003324445 | 11/2003 |
| JP | 2006109022 | 4/2006 |
| JP | 2006287980 | 10/2006 |
| JP | 2006325007 | 11/2006 |

OTHER PUBLICATIONS

Sony Pro-Audio Lab, Oxford, "Companion Document for Protocol Specification", version 3.0, http://www.sonyoxford.co.uk/pub/dmap/download/SuperMAC-spec-companion-current.pdf, archived May 6, 2006.*

Supplementary European Search Report for EP06845558 dated Feb. 1, 2012.

International Search Report, dated Sep. 14, 2007.

* cited by examiner

MEDIA ACCESS CONTROL PROTOCOL DATA UNIT AGGREGATION IN A TIME DIVISION MULTIPLE ACCESS MEDIA ACCESS CONTROL LAYER

This application claims the benefit, under 35 U.S.C. §365 of International Application PCT/US2006/047942, filed Dec. 15, 2005 which was published in accordance with PCT Article 21(2) on Jun. 19, 2008 in English. Additionally, the disclosure of this application is closely related to disclosed subject matter included in International Application PCT/US2006/047583,filed Dec. 13, 2006,which was published in accordance with PCT Article 21(2) on Jun. 19, 2008 in English and which is commonly assigned and incorporated by reference in it entirety. Furthermore, the disclosure of this application is closely related to disclose subject matter included in International Application PCT/US2006/048619, filed Dec. 20, 2006, and which is commonly assigned and incorporated by reference in its entirety.

FIELD OF THE INVENTION

The present invention relates to distribution of compressed multi-media/video from a master device such as a set top box (STB) to remote devices such as STBs in a wireless video distribution system.

BACKGROUND OF THE INVENTION

For cable video services, specific video programs are typically broadcast on the cable in their own dedicated frequency band. Any TV in the house can be tuned to any specific program by tuning to that frequency. In the case of newer TV services (e.g., satellite TV distribution, internet TV distribution), programs are "tuned" in a master STB and are then distributed to remote STBs over a home network. In many cases, a home network (or home distribution system) needs to be installed. Although wires (coax, twisted pair, etc.) are reliable, they can be expensive to install and homeowners may not like installers drilling through walls for the installation. With that in mind, the industry is interested in wireless solutions to the video program redistribution system problem.

Most existing in-home digital video distribution systems use Ethernet as the distribution media. Since most Ethernet installations use at least 100 Mbps link rates and use switches, which selectively transmit traffic only to the branch containing the addressed device, there are very few QoS issues when used in a video redistribution system with controlled traffic rates. There could be problems with Ethernet if one transmitted general IP data traffic on the same network without some type of QoS protection. There is currently one type of media access control (MAC) level QoS available for Ethernet. It is a priority based scheme, which uses the user priority field in the virtual local area network (VLAN) tag. The addition of parameterized QoS (bandwidth request, bandwidth guarantee, admission control, etc.) is currently the subject of one of the working groups within the IEEE 802.1 subcommittee on IEEE 802 network bridging. However, Ethernet has the disadvantage that it requires wires to be run and it is desirable to have a no-new-wires installation technology.

What is needed is a wireless distribution system that can replace the Ethernet distribution through MAC-level bridging. Many home networks distribute the video using IP protocols, but there are many possibilities. In some cases video is sent using UDP as specified by real time transport protocol (RTP), while in other cases (e.g., Digital Living Network Alliance (DLNA)) video is distributed over TCP. UDP requires only one way communication while TCP requires two-way communication. There are additional possibilities. It would be desirable to have a home distribution system that does not require any modifications to the master and remote devices/STBs when they already have an Ethernet interface (i.e., no bandwidth reservation, no talking to the wireless bridge devices, etc.). It is also desirable that the MAC layer be extremely efficient since the media is wireless and therefore a band-limited common media. For that reason, the present invention uses a TDMA MAC scheme. In a TDMA MAC scheme, time allocations are assigned resulting in dedicated bandwidth to each client/remote device (STB): As used herein, "/" indicates, alternative names for the same component. Since the multi-media traffic is mostly downstream from the master device to a few remote devices, there is an opportunity to eliminate overhead (preamble, PHY header, InterFrame Spacing) due to multiple PHY packets in each time allocation thereby increasing network efficiency and increasing the available net bit rate.

IEEE 802.11N, which is currently under standardization in the IEEE is being touted as a means for video distribution. There are a number of concerns with the technology that is the subject of IEEE 802.11N. First, it still is based on CSMA (IEEE 802.11). This type of MAC layer is inherently inefficient and provides no QoS guarantees. Although many MAC-level QoS enhancements are being added to IEEE 802.11N, it is unlikely that a CSMA based MAC can be as efficient as a TDMA MAC. QoS enhancements include the priority based QoS from IEEE 802.11E, some form of polling and the addition of MAC Service Data Unit (MSDU) and MAC Protocol Data Unit (MPDU) aggregation. The final method of aggregation has not been chosen yet. There have been several proposals, all different than the method described here. These enhancements can be very useful in managing the resources of an IEEE 802.11 network, but do not make any QoS guarantees that are necessary or desirable for wireless home video distribution systems. The polling could be used to create TDMA-like services on which the present invention could operate, but the polling itself cuts into the MAC efficiency. MAC efficiency is even more critical for a wireless network because of the limited link rate available to the more remote areas of a house. Most current Wireless LANs utilize a common transmission media (i.e., wireless spectrum at the same transmission frequency). Because of that, the MAC needs a mechanism for sharing that media. It should be noted that once a transmission opportunity is acquired (via CSMA) or assigned (via polling) the present invention could be employed.

IEEE 802.16 also contains a form of MPDU aggregation using a MAP at the beginning of the SuperMAC frame that indicates where the separate MPDUs start. IEEE 802.16 also includes a method of aggregating MSDUs using subheaders. Both methods increase the efficiency of an IEEE 802.16 link, but require that MPDUs start on PHY character boundaries. This implies more cooperation between the MAC and PHY layer than is desirable.

Some service providers are looking at no-new-wire technologies based on coax, phone lines, and/or power lines. There are many different possibilities, most of the possibilities have some form of priority or parameterized QoS. The problems inherent with these solutions are that even though there may be coax or phone lines already in a house, those lines still may not be wired to the right spot or may be a topology that is difficult for the technology to handle. Most of these technologies also share bandwidth with other houses (e.g., power lines for up to 4 houses are on one power transformer) and currently lack reliability. For the parameterized service, the STB must know how much bandwidth to reserve for each link. For a video home distribution system, the traffic is not under control, may be bursty, and is at least partially unknown.

The present invention encompasses a home multi-media stream distribution system that solves the problems highlighted above.

SUMMARY OF THE INVENTION

Most current Wireless LANs utilize a common transmission media (i.e., wireless spectrum at the same transmission frequency). Because of that, the media access control (MAC) layer needs a mechanism for sharing that media. Most mechanisms are based on a carrier sense multiple access (CSMA) MAC layer (e.g., IEEE 802.11). This type of MAC layer is inherently inefficient and provides no quality of service (QoS) guarantees. MAC efficiency is even more critical for a wireless network because of the limited link rate available to the more remote areas of a house. To achieve a very high efficiency and QoS guarantees, the present invention uses a MAC based on time division multiple access (TDMA) IEEE 802.15.3b. Currently, IEEE 802.15.3 does not include the ability to do MAC level aggregation (neither MSDU nor MPDU). So, in adding the aggregation, the present invention focused on a method that altered the standard MAC as little as possible.

A typical system for which the present invention is designed includes a master device that distributes internet protocol (IP) based video to up to three client/remote devices. The devices are Ethernet/Wireless MAC-level bridge devices with the actual video tuning and rendering being done in Ethernet based STBs. While the present invention is described in terms of STBs, any device with equivalent or like functionality is contemplated by the present invention regardless of the name for that device. In general, a MAC bridge connects LAN segments that could be the same or different. A collection of different LAN technologies that are interconnected by bridges is known as a bridge local area network. A MAC bridge operates below the MAC services boundary and is transparent to the protocols used above the MAC bridge services boundary, except for possibly differences in QoS.

The system and method of the present invention will be described in terms of an exemplary home video distribution system with restricted communication to three remote STBs (i.e., all communication to/from the master STB). The techniques described herein can easily be extended to a more general home network. It should be noted that to date, there are no wireless home distributions systems that can distribute three high-definition video streams to three remote locations in the house. It should also be noted that while the present invention is described in terms of an exemplary embodiment that includes video streaming, it should be readily apparent that the term "video" can be extended to include "multi-media stream" which includes other streaming media such as digital audio.

All traffic is restricted to go to/from the master bridging device. The master bridging device transmits a beacon periodically that maps out the channel time allocations (CTAs) within which each device transmits its data. The beacon plus all of the CTAs up to the next beacon is called a "superframe" as illustrated in FIG. 8. CTA 1, 2, & 3 are for downstream traffic (mostly video). CTA 4, 5, & 6 are for upstream traffic (mostly TCP acknowledgments (ACKs) and other management/control frames). The master bridging device determines the CTA allocations prior to beacon transmission. In general, the CTAs could be fixed time slots either determined by the master device (master STB) or requested by the remote device (remote STBs). However, whatever CTA time is requested or set, none of the devices really know all of the IP traffic characteristics a-priori. The traffic could be based on user datagram protocol (UDP) (no returning ACKs) or could be based on transmission control protocol (TCP). At times, all of the traffic could be downstream (asymmetric) while at other times, it could be somewhat symmetric. It is desirable to make full use of all available time allocations/slots.

Conventionally, for most WLAN's normal operation, one MAC protocol data unit (MPDU) is transmitted in each physical (PHY) PDU (PPDU) across a wireless link/channel. However, much of the time within the CTA is then used for interframe spacing (IFS), PHY preamble and PHY header. Since the video/data traffic in the present application is transmitted in timeslots that can accompany more than one frame, there is an opportunity to eliminate this overhead in order to use the CTA as efficiently as possible.

In the present invention, the MPDUs at the bottom of the MAC protocol layer are aggregated before the resultant frame is passed on to the PHY as a PHY Service Data Unit (PSDU). This structure is denominated a SuperMAC Frame as is illustrated in FIG. 14. To create the SuperMAC Frame, the standard MAC header for MPDU-1 is placed in the frame first, followed by a Header Correction Code (HCC), followed by the payload (video/data) and frame check sequence (FCS) of MPDU-1. This process is repeated, drawing MAC frames out of the appropriate transmit queue until the CTA is full or the transmit queues are empty.

The method of the present invention has several advantages. The elimination of the IFSs and intermediate PHY preambles and PHY headers greatly improves the efficiency of the MAC and therefore throughput. This results in less overhead. The addition of a HCC to protect the MAC header increases the probability of recovering MDPUs carried toward the end of the CTA in the event of an error in one of the earlier MPDU headers, which contain the length fields. Using a HCC, there is a much better chance of recovering the header and therefore the length that is necessary to locate the next MPDU in the SuperMac Frame at the receiver. If only an error detection scheme were used, it would not be known if the MPDU length were in error or some other MAC header field was in error. Without knowing the length of any given MPDU, it most likely would be impossible to recover the following MPDUs from the SuperMAC Frame. This is important because another aspect of the system of the present invention that increases its efficiency is to have only a 1% MAC Packet Error Rate (PER) compared to 10% for many other WLANs. Additionally, since actual MAC headers instead of subheaders are used in the aggregation of MSDUs of the present invention, most of the standard MAC can be reused (including fragmentation and reassembly, block ACKs, etc.). The only change is at the bottom of the MAC layer before the SuperMAC Frame is passed to the PHY layer. Thus, the present invention increases the number of actual data bits sent in each time slot by aggregating multiple MPDUs into one PSDU, eliminating IFSs and PHY headers and preambles.

A method and apparatus are described for creating a multimedia stream (e.g., video, voice, audio, etc. . . . ) SuperMAC frame in a physical protocol data unit, including inserting a physical layer header into a channel time allocation and generating the multi-media stream SuperMAC frame further including, appending a media access control header after the physical layer header, calculating a header correction code, appending the header correction code after the media access control header, appending a media access control multi-media stream payload from a transmit queue, calculating a frame check sequence, appending the frame check sequence after the media access control multi-media stream payload and repeating the above acts, after inserting the physical layer header, until one of the channel time allocation is full or all transmit queues are empty. A method and apparatus are described for decoding a received multi-media stream Super-MAC frame in a physical protocol data unit, including isolating a media access control header, isolating a header correction code, checking for and correcting errors in the media access control header, determining a boundary for a unit of multi-media stream payload within the multi-media stream SuperMAC frame, repeating the above acts until all multi-media stream payloads have been recovered from the multi-media stream SuperMAC frame and converting the multi-media stream payloads in the SuperMAC frame to multi-media stream Ethernet frames.

BRIEF DESCRIPTION OF THE DRAWINGS

The present invention is best understood from the following detailed description when read in conjunction with the accompanying drawings. The drawings include the following figures briefly described below.

DETAILED DESCRIPTION OF THE PREFERRED EMBODIMENTS

The present invention starts with an IEEE 802.15.3b MAC, which supports TDMA services (beacon at beginning of the superframe with transmission time allocations within the superframe). IEEE 802.15.3b supports PHY PDU (PPDU) aggregation by transmitting PHY packets within a CTA using a minimum IFS (MIFS). This IFS can be used when packets from one device are sent consecutively (as with the present invention). However, the MIFS and the PHY preamble and header associated with each PPDU add overhead with no added value except to minimize clock drift at the PHY layer. The present invention makes use of all available time in a CTA by reducing the amount of PHY overhead.

Figure 1:
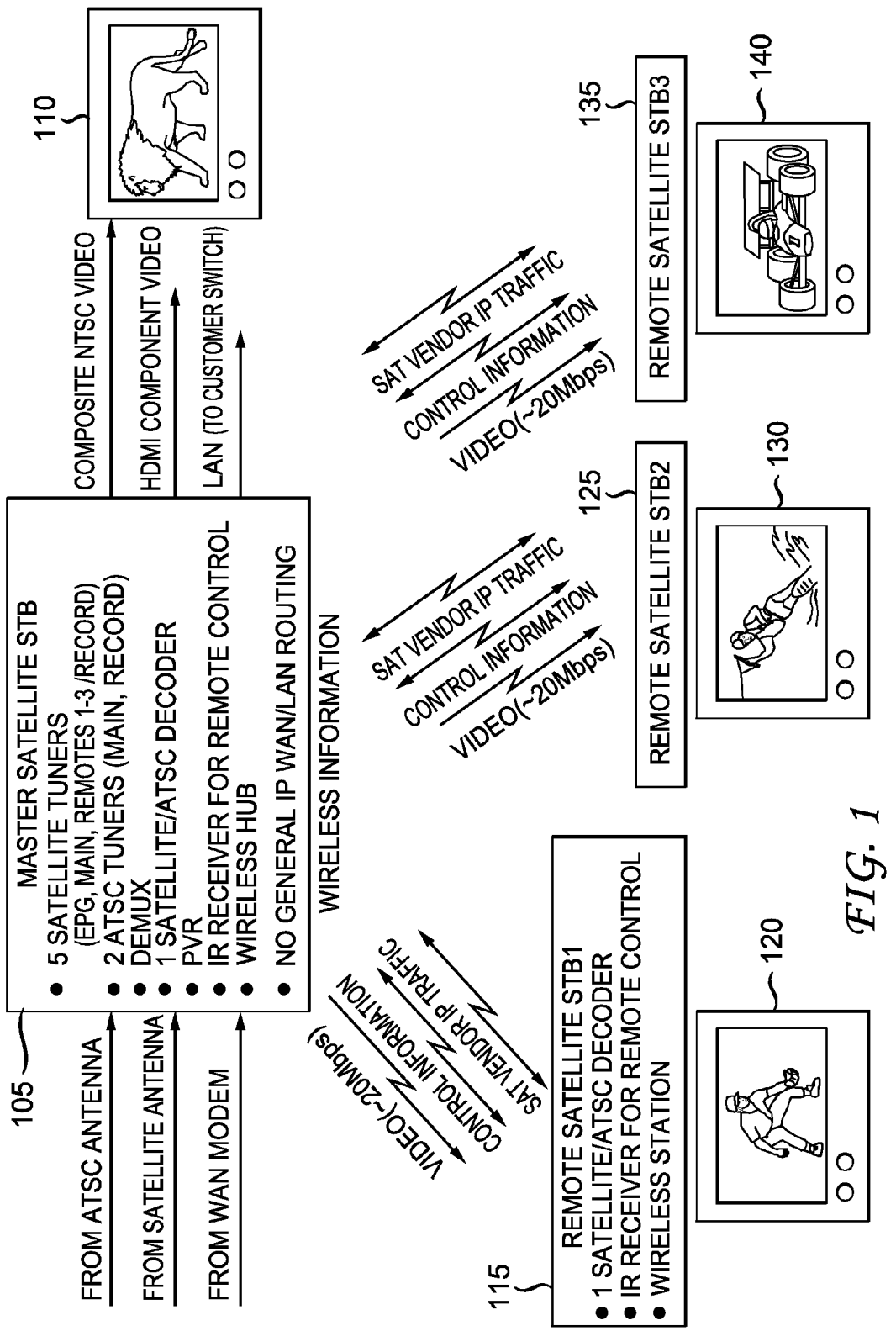
FIG. 1 is an exemplary wireless home video distribution system in accordance with the principles of the present invention.

The present invention concerns the MAC and bridging layers of a wireless video service distribution system, which distributes compressed video from a master STB to remote STBs. The system makes partial use of an IEEE 802.15.3b TDMA MAC and therefore uses some of the terminology from that standard. An exemplary system with the technology built into the STBs is shown in FIG. 1.

The master STB 105 receives input from a variety of sources of video including an Advanced Television Systems Committee (ATSC) antenna (digital TV), a satellite antenna and a wide area network (WAN) modem. The master STB provides output to a video display 110 (for example, TV) including a composite National Television Standards Committee (NTSC) video display, High-Definition Multimedia Interface (HDMI) component video display and a local area network (LAN) connected to a customer switch. The master STB has 5 satellite tuners (electronic program guide (EPG), main, three remote tuners and a recording tuner). The main tuner is for tuning to the program that the user of the display in communication with the master STB desires. The three remote tuners are for tuning to the programs that each of the users of the remote displays desire. The EPG tuner is for tuning to the electronic program guide. The recording tuner is to tune to a program that the user of the display in communication with the master STB wants to record while he/she is watching the program tuned to by the main satellite tuner. The master STB has two ATSC tuners—a main tuner and a recording tuner. The main tuner is for tuning to the program that the user of the display in communication with the master STB desires. The recording tuner is to tune to a program that the user of the display in communication with the master STB wants to record while he/she is watching the program tuned to by the main ATSC tuner. The master STB also has a demultiplexer (demux), a personal video recorder (PVR), an infrared (IR) receiver for use with a remote control device, a satellite/ATSC decoder and a wireless hub. The present invention assumes that there is no general IP WAN/LAN routing needed. Master STB 105 can transmit video to each remote STB at about 20 Mbps. Master STB 105 can exchange satellite vendor IP traffic with each remote STB. Master STB 105 can exchange control information with each remote STB.

The master STB is in communication with three remotes STBs (remote STB1 115, remote STB2 125 and remote STB3 135). Remote STB1 115 is in communication with a video display 120. Remote STB2 125 is in communication with a video display 130. Remote STB3 135 is in communication with a video display 140. The remotes STBs are similarly configured so only remote STB1 will be described. Remote STB1 115 has a satellite/ATSC decoder, an IR receiver for use with a remote control device and a wireless station. Remotes STB1 115 can receive video from master STB 105 at about 20 Mbps. Remote STB1 can exchange satellite vendor IP traffic between itself and master STB 105. Remote STB1 115 can exchange control information with master STB 105.

Figure 2:
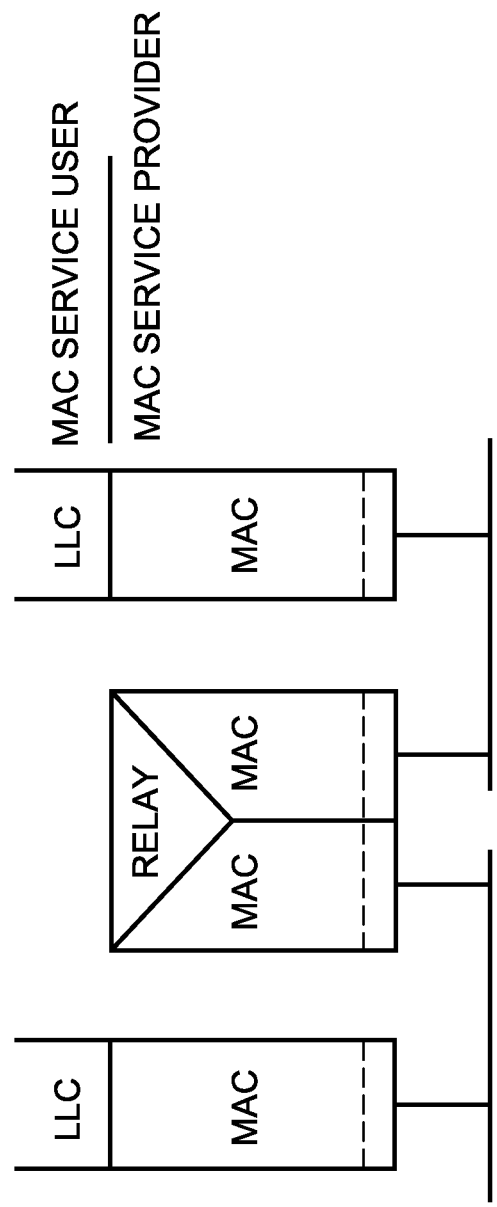
FIG. 2 is a MAC-level bridge.

The present invention is built as a MAC-level wireless bridge (see FIG. 2). In general, a MAC bridge connects LAN segments that could be the same or different. A collection of different LAN technologies that are interconnected by bridges is known as a bridge local area network. A MAC bridge operates below the MAC services boundary and is transparent to the protocols used above the MAC bridge services boundary, except for possibly differences in QoS. The MAC services user is above the MAC services boundary and the MAC services provider is below the MAC service boundary. The MAC layer bridge includes a relay to interface with each LAN segment/component.

Figure 3:
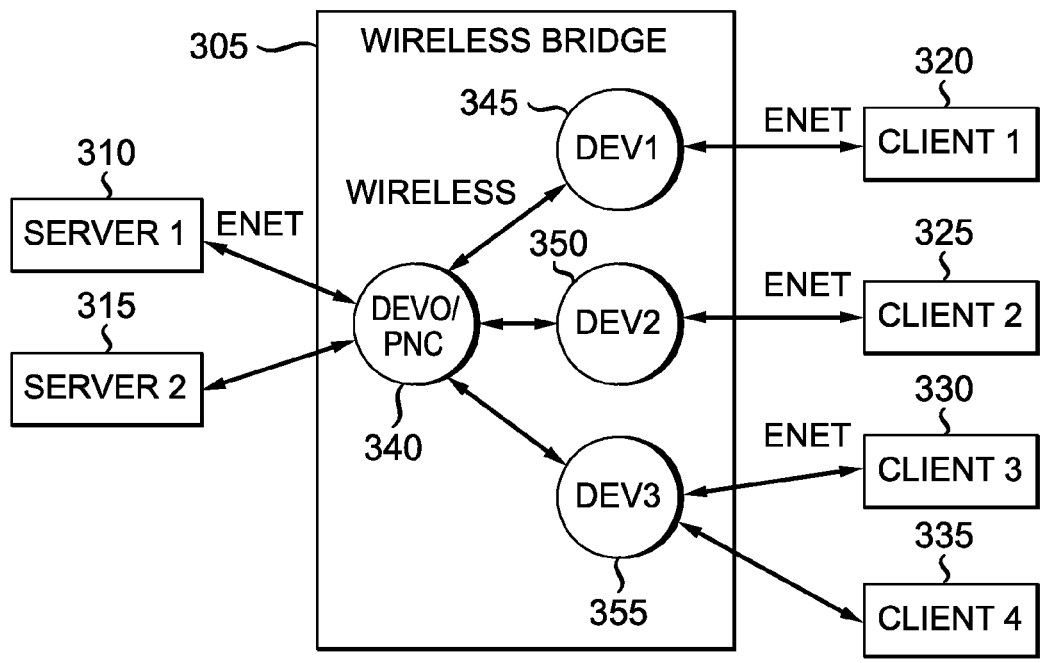
FIG. 3 is a general wireless bridge.

A general wireless bridge is shown in FIG. 3. Wireless bridge 305 is in communication with servers via Ethernet connections. Two servers 310, 315 are shown. Wireless bridge 305 is also in communication with clients via Ethernet connections. Four clients 320, 325, 330, 335 are shown. Within the general wireless bridge is DEV0, which is a piconet controller (PNC) 340. PNC 340 is in communication with a plurality of devices wirelessly. Three devices DEV1 345, DEV2 350 and DEV3 355 are shown. DEV0/PNC 340 is in communication with server 310, 315. DEV1 345 is in communications with client 320. DEV2 350 is in communication with client 325. DEV3 355 is in communication with clients 330, 335.

Figure 4:
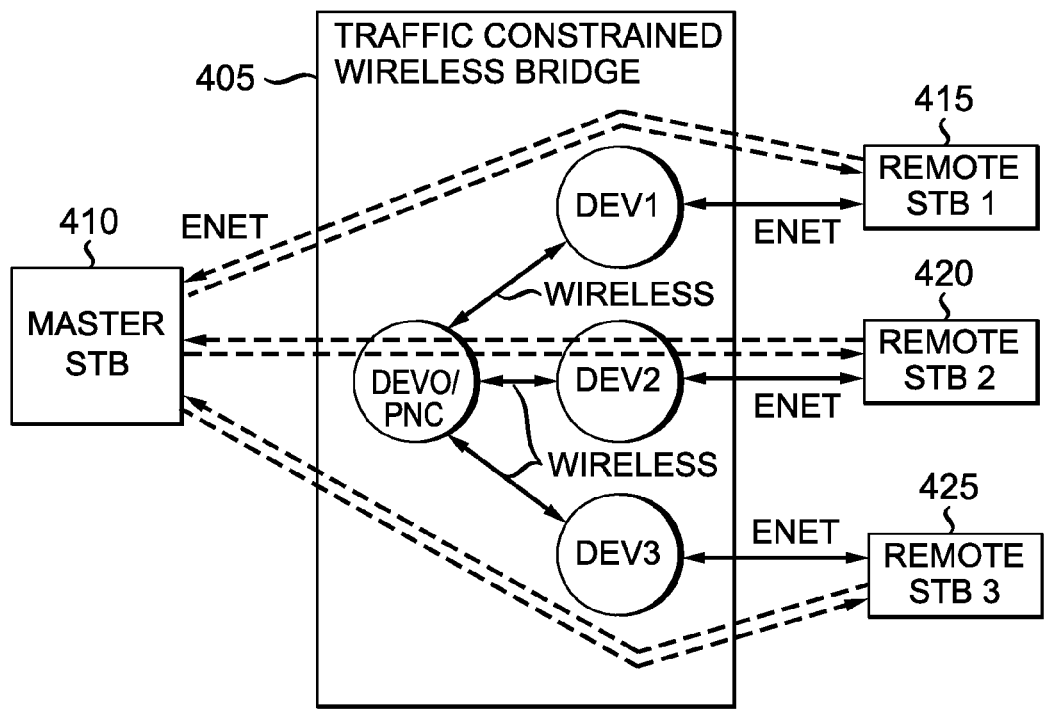
FIG. 4 is a wireless bridge having constrained paths suitable for wireless home video distribution in an exemplary embodiment of the present invention.

The exemplary embodiment of the present invention, however, has constrained paths suited for a wireless home video service distribution application. Possible data paths are shown by dashed lines in FIG. 4. Wireless bridge 405 is in communication with master STB 410 wirelessly. Wireless bridge 405 is also in communication with remote STBs 415, 420, 425 wirelessly. Wireless bridge 405 internally is configured as shown in FIG. 2. All traffic goes to/from master STB 410.

Figure 5:
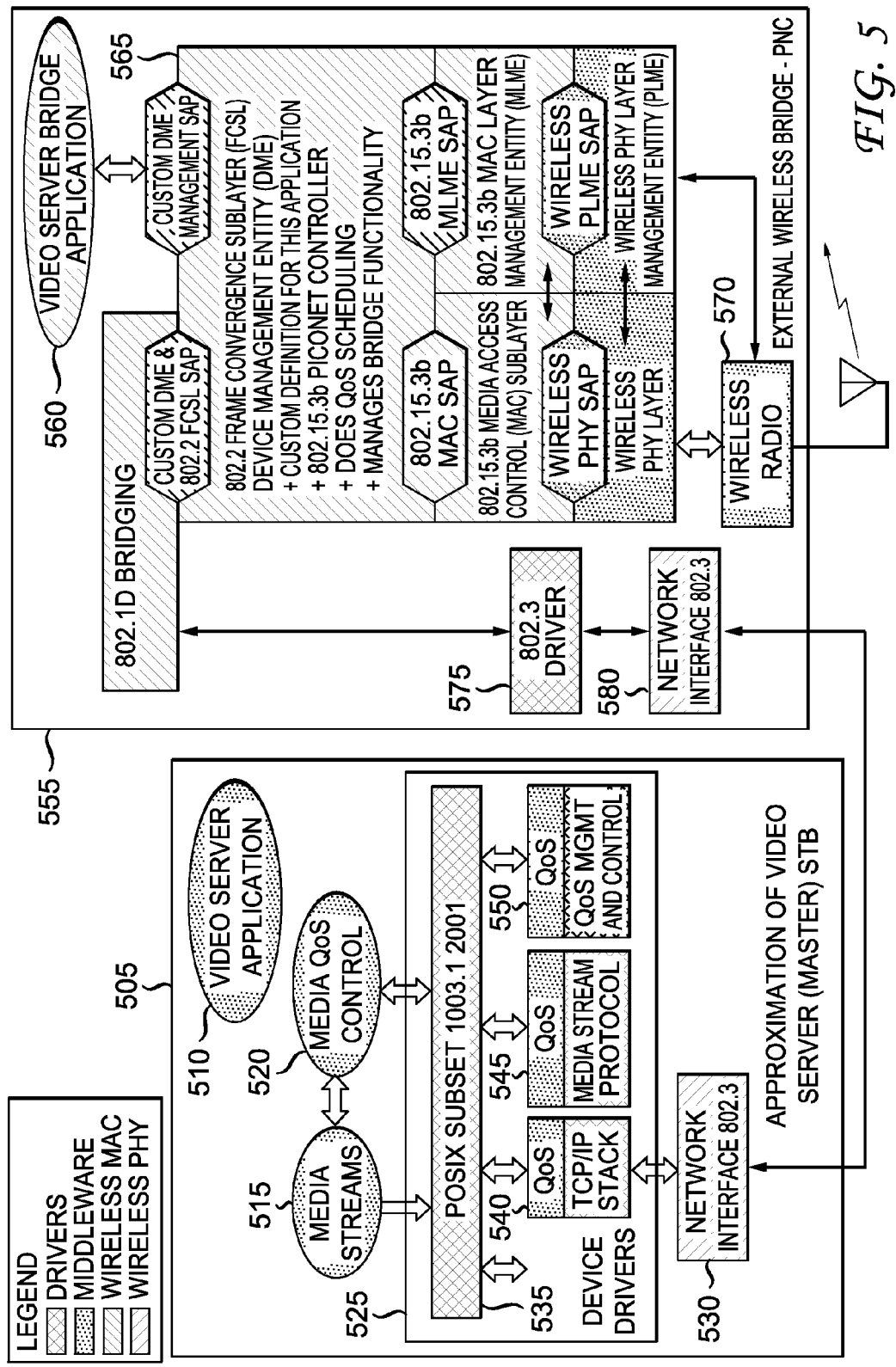
FIG. 5 is a block diagram of the software (logical structure) of the master STB and the server side of the wireless MAC bridge.
Figure 6:
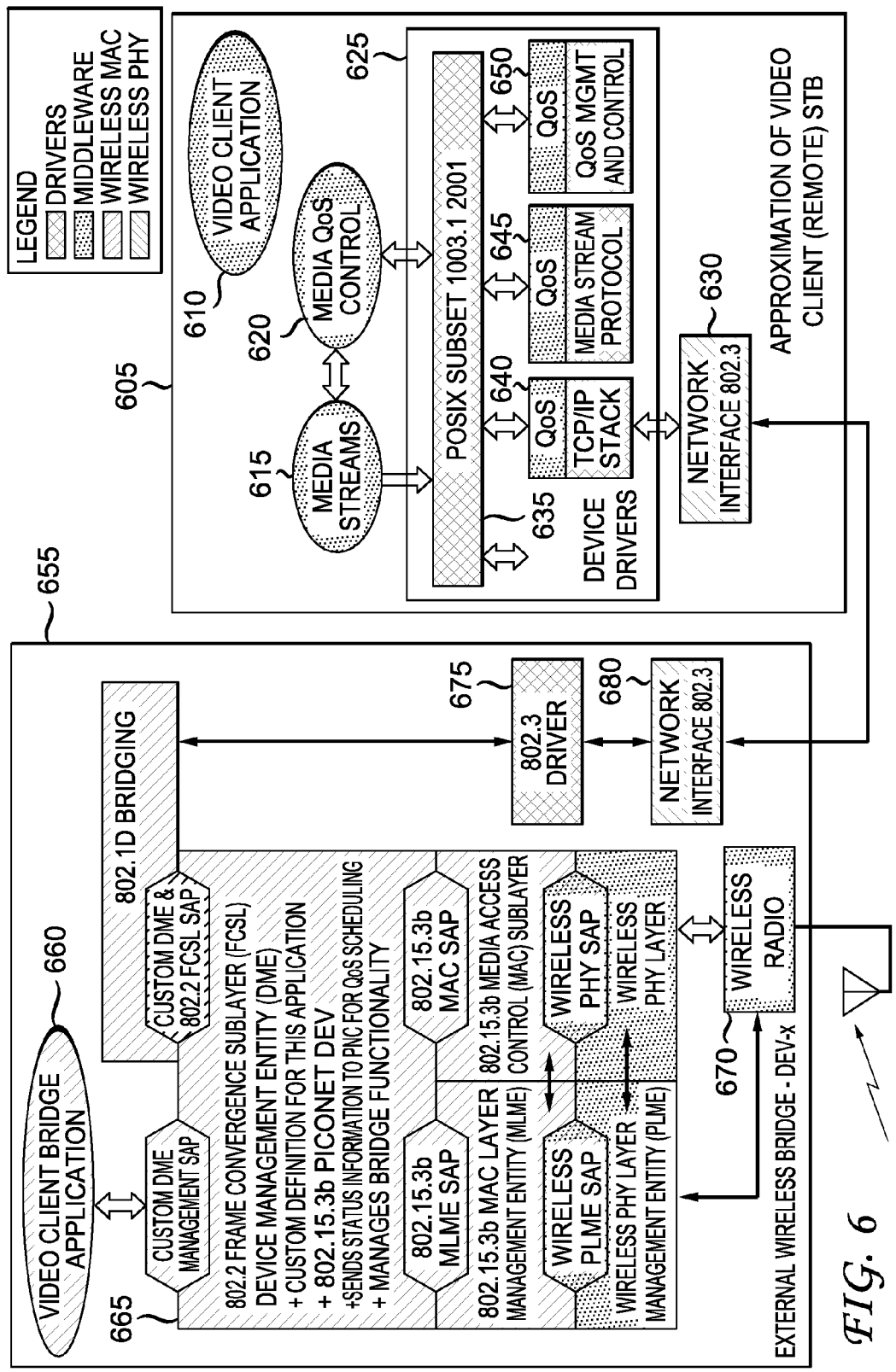
FIG. 6 is a block diagram of the software (logical structure) of the remote/client STB and the client side of the wireless MAC bridge.
Figure 7:
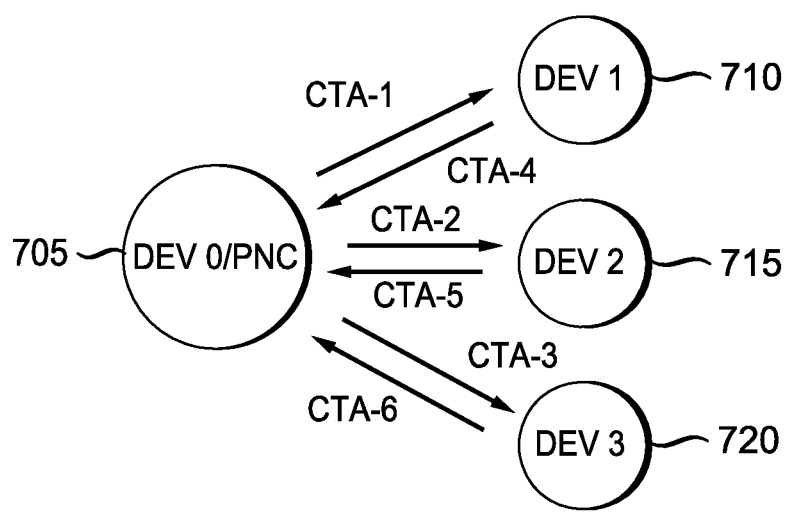
FIG. 7 is a block diagram of a wireless high-definition MAC bridge showing how CTAs are used in accordance with the principles of the present invention.

FIG. 5 shows the software architecture of the server side (master STB and bridge device). It is noted that the master bridge device is also the piconet controller (PNC) as described in IEEE 802.15.3. The master STB 505 has a middleware video server application 510 in the master STB 505. Multi-media stream middleware 515 interfaces with both media QoS control 520 and device drivers 525. Multi-media stream middleware 515 forwards video data to device drivers 525 and exchanges control information with Media QoS control middleware 520. Media Qos control middleware exchanges control information with CDI drivers 525. Device drivers 525 exchange primarily video data with network interface (IEEE 802.3) 530. Within device drivers 525 are a subset of portable operating system Unix (POSIX) drivers 535 for receiving video data and control information from media stream middleware 515 and exchanging information with media QoS control middleware 520. The subset of POSIX drivers exchange information with QoS middleware that is in a stack with TCP/IP 540 and media stream protocol 545 and QoS management and control 550. The PNC 555 has a wireless MAC video server bridge application 560, which exchanges control information with software 565, which includes a plurality of software modules. Software 565 exchanges video data and control information with wireless radio interface 570 and with IEEE 802.3 driver 575. IEEE 802.3 driver exchanges primarily video data with IEEE 802.3 network interface 580, which interfaces and exchanges that video information with IEEE 802.3 network interface 530. Software 565 includes a number of software components including an IEEE 802.1D bridging module, which is layered on a wireless device management entity (DME) and IEEE 802.2 frame convergence sublayer (FCSL) service access point (SAP). Wireless MAC video server bridge application 560 interfaces with wireless DME management SAP. Both wireless DME management SAP and wireless DME and IEEE 802.2 FCSL SAP are layered over the IEEE 802.2 FCSL DME, which performs the functions of an IEEE 802.15.3b PNC, does QoS scheduling and manages bridge functionality. The IEEE 802.2 FCSL DME is layered over an IEEE 802.15.3b MAC SAP and an IEEE 802.15.3b MAC layer management entity (MLME) SAP. The IEEE 802.15.3b MAC layer management entity (MLME) SAP is layered over an IEEE 802.15.3b MLME, which is layered over the wireless physical layer management entity (PLME) SAP. The IEEE 802.15.3b MAC SAP is layered over the IEEE 802.15.3b MAC sublayer, which is layered over the wireless physical SAP. The IEEE 802.15.3b MAC SAP is layered over the wireless physical layer. The wireless physical layer management entity (PLME) SAP is layered over the wireless physical layer PLME. The wireless PLME is in communication with the wireless physical layer. The IEEE 802.15.3b MAC sublayer is in communication with the IEEE 802.15.3b MLME. Both the wireless physical layer and the wireless PLME exchange video data and control information with the wireless radio interface FIG. 6 shows the SW architecture for the client side (Remote STB and Bridge Device). Note that the present invention is in the bridge devices, but the STBs are shown for context. It is noted that the remote/client bridge device is also a DEV-x (non-PNC device) as described in IEEE 802.15.3. The remote/client STB 605 has a middleware video client application 610 in the remote/client STB 605. Media stream middleware 615 interfaces with both media QoS control 620 and CDI drivers 625. Media stream middleware 615 accepts video data from device drivers 625 and exchanges control information with Media QoS control middleware 620. Media QoS control middleware exchanges control information with device drivers. Device drivers 625 exchange mostly video data with network interface (IEEE 802.3) 630. Within device drivers 625 are a subset of POSIX drivers 635 for sending primarily video data to media stream middleware 615 and exchanging information with media QoS control middleware 620. The subset of POSIX drivers exchange information with QoS middleware that is in a stack with TCP/IP 640 and media stream protocol 545 and QoS management and control 650. The DEV-x 655 has a wireless MAC video client bridge application 660, which exchanges video data and control information with software 665, which includes a plurality of software modules. Software 665 exchanges video data and control information with wireless radio interface 670 and with IEEE 802.3 driver 675. IEEE 802.3 driver exchanges primarily video data with IEEE 802.3 network interface 680, which interfaces and exchanges that video data with IEEE 802.3 network interface 630. Software 665 includes a number of software components including an IEEE 802.1D bridging module, which is layered on a wireless DME and IEEE 802.2 FCSL SAP. Wireless MAC video client bridge application 660 interfaces with wireless DME management SAP. Both wireless DME management SAP and wireless DME and IEEE 802.2 FCSL SAP are layered over the IEEE 802.2 FCSL DME, which performs the functions of an IEEE 802.15.3b DEV-x, sends status to the PNC for QoS scheduling and manages bridge functionality. The IEEE 802.2 FCSL DME is layered over an IEEE 802.15.3b MAC SAP and an IEEE 802.15.3b MLME SAP. The IEEE 802.15.3b MLME SAP is layered over an IEEE 802.15.3b MLME, which is layered over the wireless physical layer management entity (PLME) SAP. The IEEE 802.15.3b MAC SAP is layered over the IEEE 802.15.3b MAC sublayer, which is layered over the wireless physical SAP. The IEEE 802.15.3b MAC SAP is layered over the wireless physical layer. The wireless PLME SAP is layered over the wireless physical layer PLME. The wireless PLME is in communication with the wireless physical layer. The IEEE 802.15.3b MAC sublayer is in communication with the IEEE 802.15.3b MLME. Both the wireless physical layer and the wireless PLME exchange video data and control information with the wireless radio interface Referring now to FIG. 7, which is a block diagram of a wireless MAC bridge in accordance with the principles of the present invention. PNC 705 transmits and receives data/information to/from the remote STBs 710, 715, 720 in the assigned CTAs. The master device 705 transmits a beacon periodically that maps out the channel time allocations (CTAs) within which each device transmits it's data. CTA 1, 2, & 3 are for downstream traffic (mostly video). CTA 4, 5, & 6 are for upstream traffic (mostly TCP ACKs and other management frames).

Figure 8:
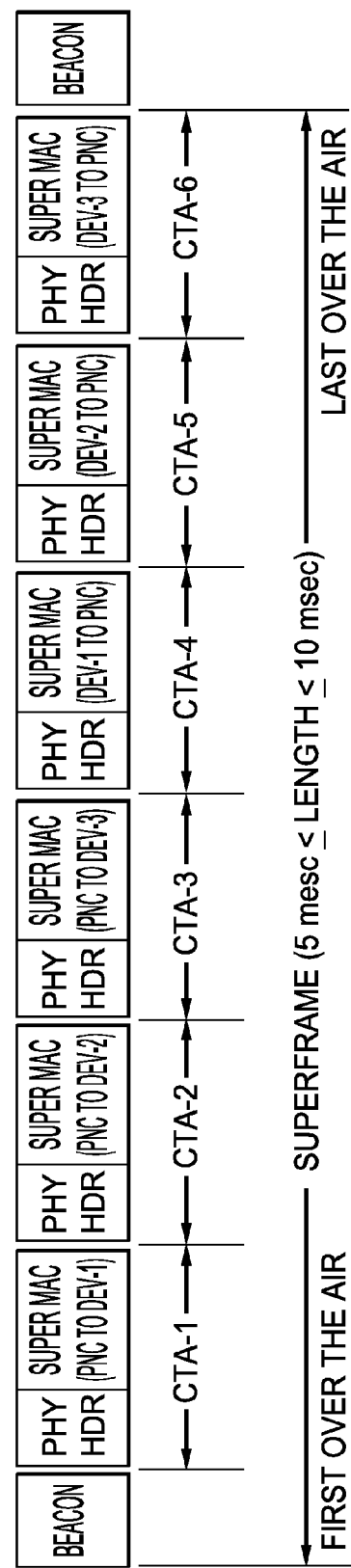
FIG. 8 depicts a superframe in accordance with the present invention.

Superframe is shown in FIG. 8. The master device determines the CTAs prior to beacon transmission. In general, the CTAs could be fixed time slots either determined by the master device/PNC or requested by a remote device/STB. Specifically, for IEEE 802.15.3b, the standard specifies the remote STBs/devices to request bandwidth by sending a "CTReq" message to the PNC. However, whatever CTA time is requested or set, none of the devices really knows all of the IP traffic characteristics a-priori, especially the remote STBs. The traffic could be based on UDP (no returning ACKs) or could be based on TCP. At times, all of the traffic could be downstream while at other times, it could be somewhat symmetric. It is desirable to make full use of all available time by adapting the amount of time within CTAs to optimize traffic flow. The leftmost portion of the superframe is transmitted over the air first and the rightmost portion of the superframe is transmitted over the air last. Following the beacon, the CTAs are transmitted in order with the downstream CTAs being transmitted first and the upstream CTAs being transmitted thereafter. Superframes in the context of the present invention can vary between 5 msec and 10 msec.

Figure 9:
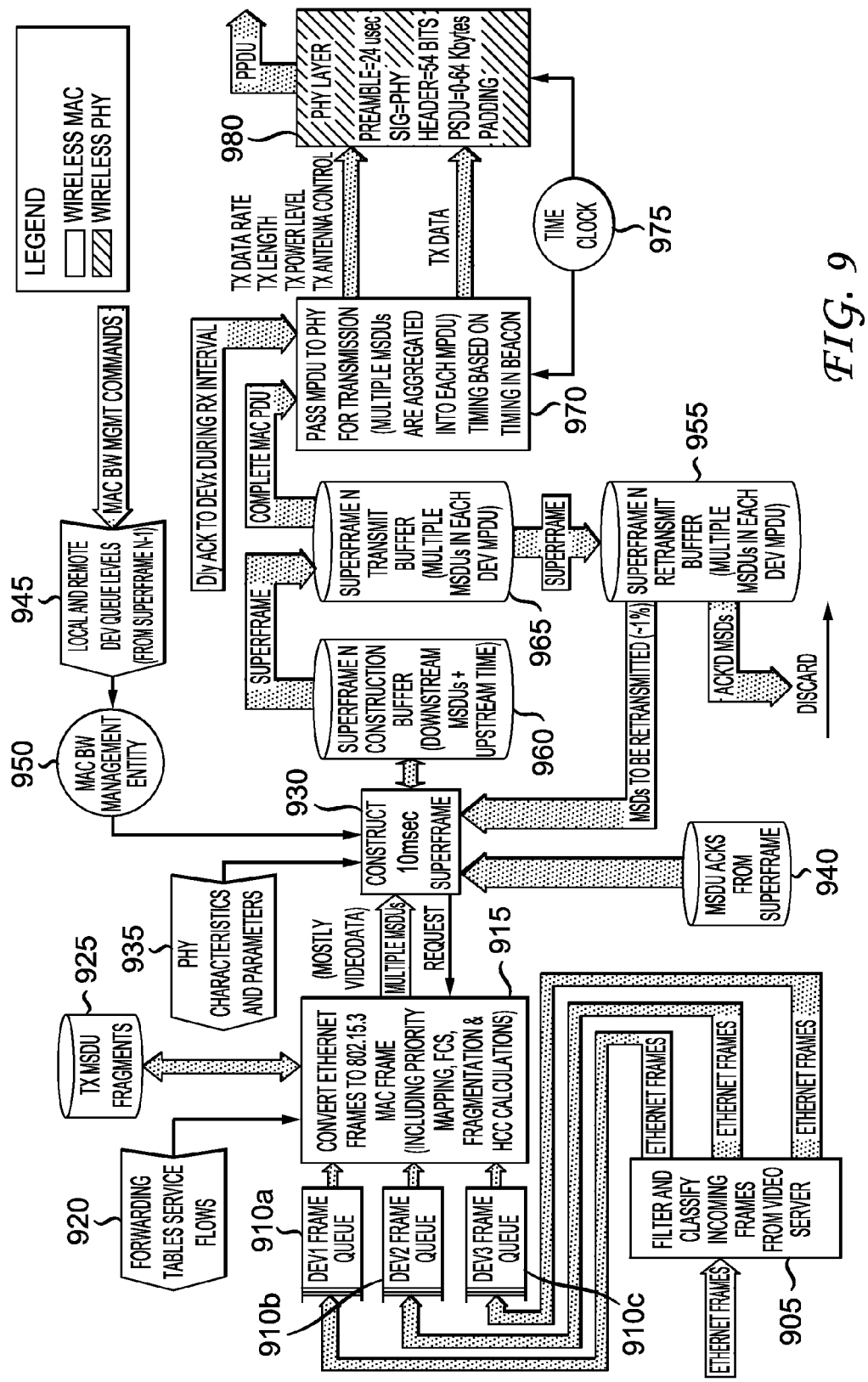
FIG. 9 is a high level transmit packet flow diagram for the PNC connected to the wireless high-definition video server (master STB).
Figure 10:
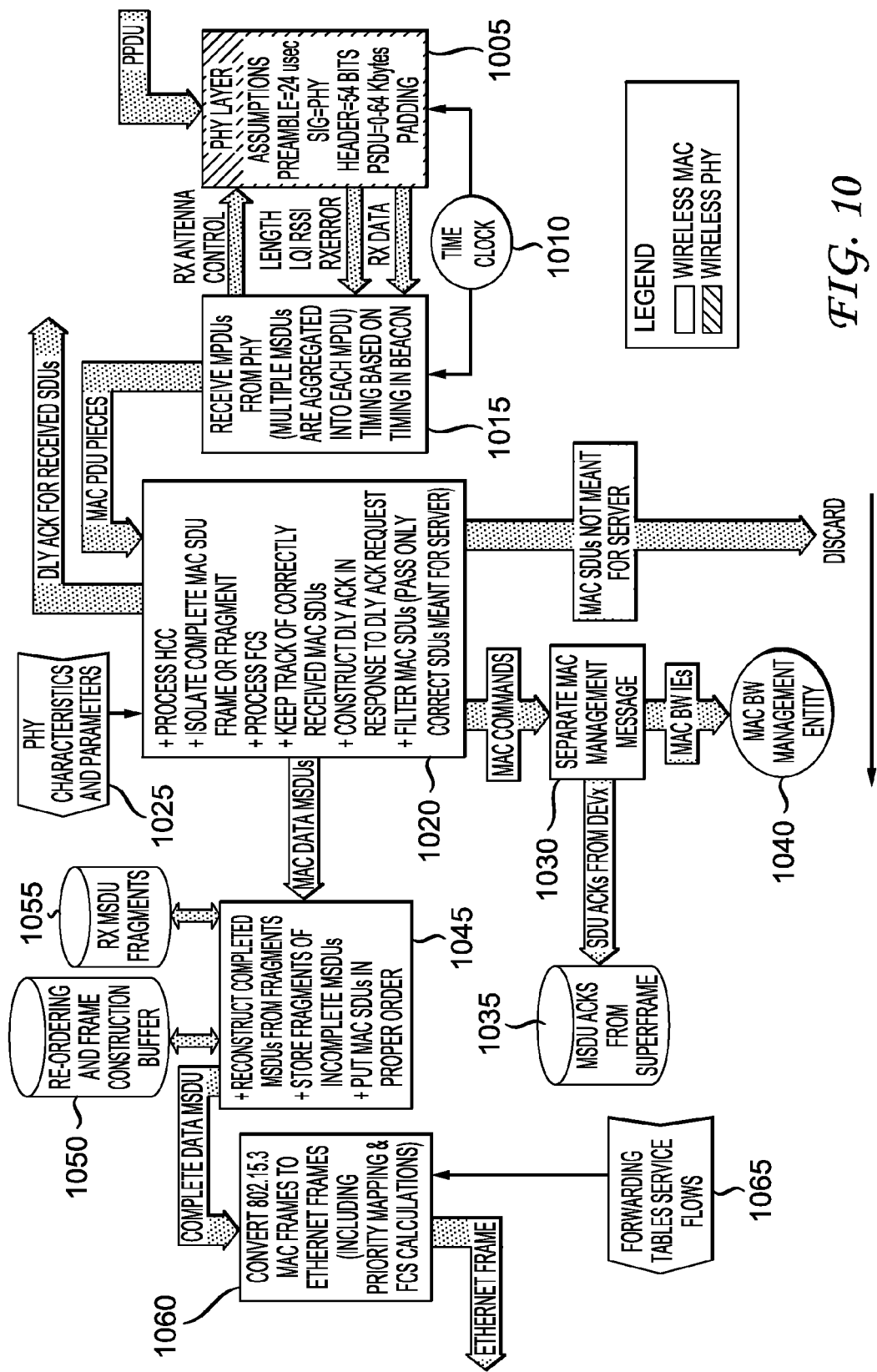
FIG. 10 is a high level receive packet flow diagram for the PNC connected to the video server (master STB).
Figure 11:
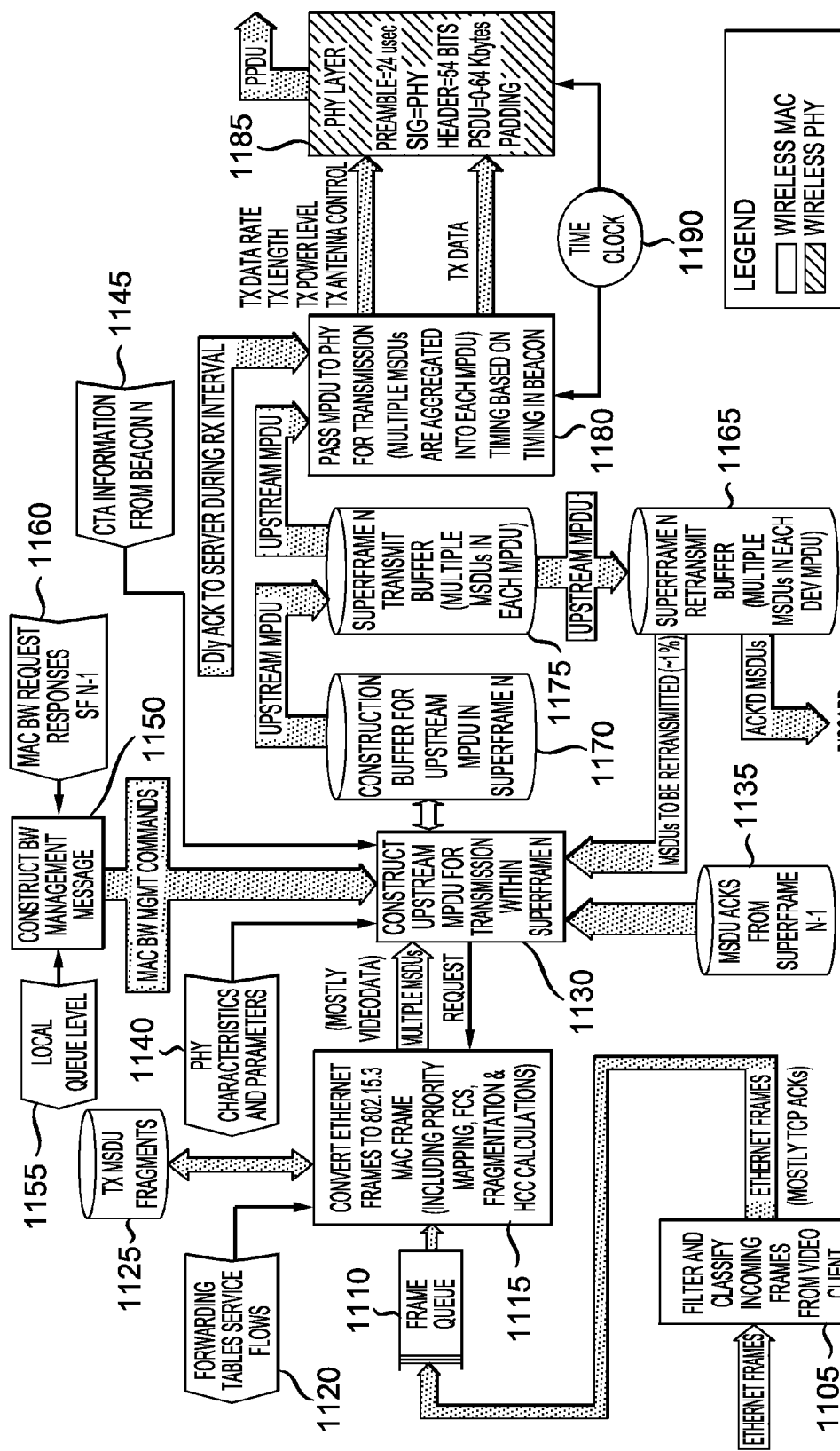
FIG. 11 is high level transmit packet flow diagram for the DEV-x connected to a video client (client/remote STB).
Figure 12:
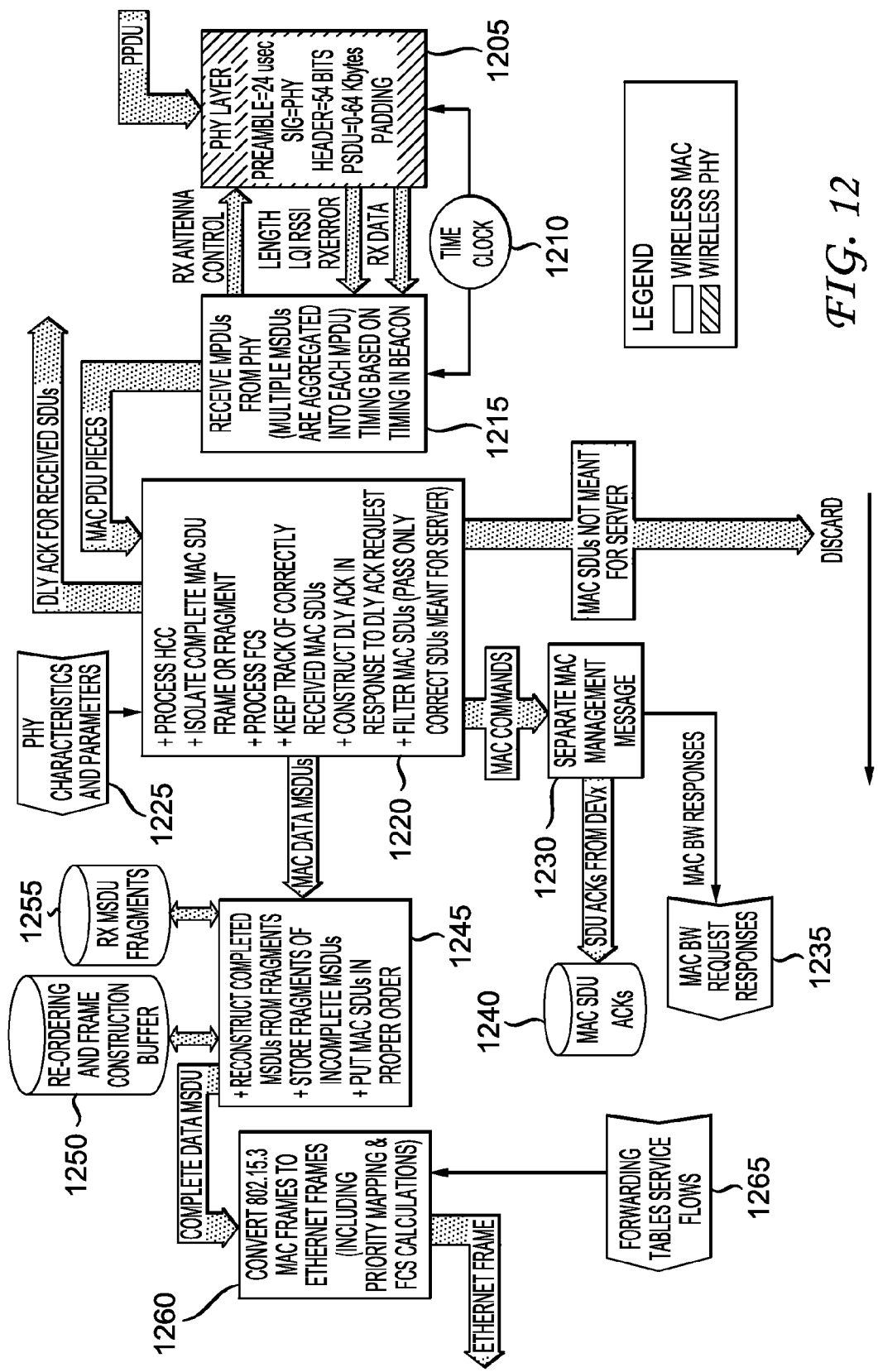
FIG. 12 is a high level receive packet flow diagram for the DEV-x connected to a video client (client/remote STB).

Exemplary packet flow diagrams for the PNC connected to the master STB are shown in FIGS. 9 and 10. Exemplary packet flow diagrams for a DEV-x (i.e., non-PNC device) connected to a remote STB are shown in FIGS. 11 and 12. As has been described above, the wireless high definition MAC bridge of the exemplary video distribution system acts as a constrained bridge.

Referring now to FIG. 9, the PNC receives Ethernet video data frames on the Ethernet port (mostly video) 905. The PNC determines the length of the superframe and each CTA. It places the frame in the proper transmit queue 910*a*, 910*b*, 910*c* depending on the destination MAC address. The PNC can either learn the MAC address through flooding as described in IEEE 802.1D or the filtering/routing tables can be filled manually. For purposes of reducing clutter on the figure, the present invention is described assuming only one queue per transmit port (destined for each DEV-x/remote STB). If multiple priorities are desired, then there would be multiple queues per transmit port (destined for each DEV-x/remote STB). That is, one queue for each priority group. The Ethernet video data frames are divided into the queues. In the exemplary embodiment the queues are 165 kbytes each and the superframe is between 5 msec and 10 msec long. The video data frames from the queues are forwarded to a software module 915 that converts the Ethernet video data frames to IEEE 802.15.3b MAC frames including priority mapping, frame check sequence (FCS), fragmentation and header correction code (HCC) calculations. The software module 915 receives forwarding tables and service flows to process the received Ethernet video data frames from data storage unit 920. Software module 915 is in communication with a buffer 925 for storing the transmit MAC service data units (MSDUs). Software module 930 requests the MAC frames from software module 915 in order to construct the superframe. Software module 915 forwards multiple MSDUs to software module 930. Software module 930 receives physical characteristics and parameters from data storage unit 935 and MSDUs acknowledgments (ACKs) from the previous service frame from a buffer 940 in order to construct the superframe. Data storage unit 945 receives MAC bandwidth management commands that are stored as local and remote DEV (STBs) queue lengths from the previous superframe so that the CTA lengths can be varied. This information is forwarded to MAC bandwidth management entity 950, which forwards the CTA lengths to software module 930 in order to further support the construction of the superframe. Software module 930 also receives the MSDUs to be retransmitted from the previous frame from superframe retransmit buffer 955, which stores multiple MSDUs in each remote STB MAC protocol data unit (MPDU) and discards acknowledged MSDUs. The superframe constructed by software module 930 is stored in superframe construction buffer 960. The superframe constructed by software module 930 includes downstream MPDUs and upstream time. Superframe construction buffer 960 forwards the constructed superframes to superframe transmit buffer 965 in the form of multiple MSDUs in each remote STB MPDU. Superframe transmit buffer 965 forwards the superframes it receives from superframe construction buffer to superframe retransmit buffer 955. Superframe transmit buffer 965 forwards the complete MPDU to software module 970. Software module receives a delayed ACK from the remote STBs during the receive interval and timing information from the time clock 975. Software module 970 aggregates multiple MSDUs into each MPDU and forwards them to the physical layer module 980 for transmission. Software module 970 uses the timing based on the timing in the beacon and forwards the transmit data, transmit data rate, transmit length, transmit power level and transmit antenna control to physical layer module 980, which transmits the physical data protocol unit (PPDU) from the PNC to the designated remote STB.

Since FIG. 10 is depicting receive packet flows the description will begin and proceed from the right hand side of the diagram. A PPDU is received at physical layer software module 1005, which also receives input from time clock 1010. Physical layer software module forwards the received data, length, link quality indicator (LQI), received signal strength indicator (RSSI) and PHY receive errors to software module 1015. Software module 1015 breaks the PPDU into MPDUs which are aggregated MSDUs using timing based on the timing beacon and forwards the MPDUs to software module 1020, which performs the HCC calculations, isolates the complete MSDU frame or fragment, processes the frame check sequence, keeps track of correctly received MSDUs, constructs the delayed ACK in response to the delayed ACK request and filters the MSDUs so that only the correct MSDUs intended for the server are passed on to the server (master STB). Software module 1020 transmits the delayed ACK for the received MSDUs and discards the MSDUs not intended for the server (master STB). Software module 1020 receives physical characteristics and parameter from data storage unit 1025 in order to perform the above described functions. Software module 1020 forwards MAC commands such as delayed ACKS and bandwidth management messages to software module 1030, which separates the MAC commands and forwards the MSDU ACKs to MSDU ACK buffer 1035 and forwards the MAC bandwidth information elements (IEs) to MAC bandwidth management entity 1040. Software module 1020 also forwards MSDUs (mostly TCP ACKs) to software module 1045, which reconstructs completed MSDUs from fragments, stores fragments of incomplete MSDUs and puts MSDUs in the proper order. Software module 1045 is in communication with re-ordering frame construction buffer 1050 and receive MSDU fragment buffer 1055. Software module 1045 forwards the complete MSDUs to software module 1060, where the complete MSDUs are converted to Ethernet frames including frame check sequence and priority mapping. Software module receives forwarding tables and service flow information from data storage unit 1065 and forwards the Ethernet frames to the server (master STB).

FIG. 11 is the high level transmit packet flow for a DEV-x connected to a remote STB (video client). Ethernet frames are received by software module 1105, which filters and classifies incoming frames from the video client. Software module 1105 forwards the Ethernet frames to frame queue 1110. There is only one queue since all traffic should be going to the server (master STB). However, if multiple priorities are desired, there multiples queues are implemented—one queue for each priority group. The data in the queue is forwarded to software module 1115, which converts the Ethernet frames to IEEE 802.15.3 MAC frames including priority mapping, frame check sequence, fragmentation and HCC calculations. Software module 1115 receives forwarding table and service flow information from data storage unit 1120. Software module 1115 is also in communication with transmit MSDU transmit buffer 1125. Software module forwards multiple MSDUs to software module 1130, which constructs upstream MPDU for transmission within the next superframe. Software module 1115 also receives requests from software module 1130. Software module 1130 receives MSDU ACKs from the previous superframe from buffer 1135. Software module 1130 receives physical characteristics and parameters from data storage unit 1140 and receives CTA information from the beacon from data storage unit 1145. Software module 1130 receives MAC bandwidth management commands from software module 1150, which constructs bandwidth management message using local queue length information received from data storage unit 1155 and MAC bandwidth request responses (IEEE 802.15.3 MAC command used in a non-standard way to exchange queue information) from the previous superframe from data storage unit 1160. Software module 1130 receives MSDUs to be retransmitted from the previous superframe from superframe retransmit buffer 1165. There are multiple MSDUs in each MPDU. Superframe retransmit buffer 1165 also discards acknowledged MSDUs. Software module 1130 is in communication with construction buffer 1170, which is a buffer for upstream MPDUs for the next superframe. Construction buffer 1170 forwards the upstream MPDUs to superframe transmit buffer 1175, which forwards the upstream MPDUs to software module 1180. Superframe transmit buffer 1175 also forwards the upstream MPDUs to superframe retransmit buffer 1165. Software module 1180 aggregates multiple MSDUs into each MPDU using timing based on the beacon and passes the MPDUs to the physical layer software module 1185 for transmission. Software module receives time from time clock 1190 and receives delayed ACKs from the server (master STB) during the receive interval. Software module 1180 forwards transmit data, transmit data rate, transmit length, transmit power level and transmit antenna control to physical layer software module 1185.

An approximation of the receive process in the remote DEVs is shown in FIG. 12. The receive process mostly consists of disassembling the superframe and then reconstructing Ethernet Frames, including reassembling fragmented frames. The receive side also checks for errors and prepares a DLY ACK (a type of bulk ACK) for transmission back to the PNC. The DLY ACKs are sent at the beginning of the CTA heading the opposite direction of the CTA within which the packet arrived. This is another deviation from the standard.

FIG. 12 is a high level receive packet flow diagram for the DEV-x connected to video client (remote STB) so the description will begin and proceed from the right hand side of the diagram. Software module 1205 receives PPDU and forwards the received data, received errors, length, LQI and RSSI to software module 1215. Software module 1205 receives receive antenna control information from software module 1215 and receives timing information from time clock 1210. Software module 1215 receives MPDUs from physical layer software module 1205. Multiple MSDUs are aggregated into each MPDU. Software module 1215 receives timing from time clock 1210. Software module 1215 forwards MPDU pieces to software module 1220, which performs HCC calculations, isolates complete MSDU frames or fragments, processes frame check sequence, keeps track of correctly received MSDUs, constructs a delayed ACK in response to a delayed ACK request and filters MSDUs and forwards only correctly received MSDUs intended for the server (master STB). Software module receives physical characteristics and parameters from data storage unit 1225 and forwards delayed ACKs for the received MSDUs. Software module 1220 discards MSDUs not intended for the video client (remote STB). And forwards MAC commands to software module 1230, which separates MAC management messages and forwards MAC bandwidth responses to data storage unit 1235 and forwards MSDU ACKs from the remote STBs to MSDU buffer 1240. Software module 1220 forwards MSDUs to software module 1245, which reconstructs completed MSDUs from fragments, stores fragments of incomplete MSDUs and puts MSDUs in the proper order. Software module 1245 is in communication with re-ordering and frame construction buffer 1250 and receive MSDU fragment buffer 1255. Software module 1245 forwards complete MSDUs to software module 1260, which converts MAC frames to Ethernet frames including priority. Software module 1260 also receives forwarding table and service flow information from data storage unit 1265.

Figure 13:
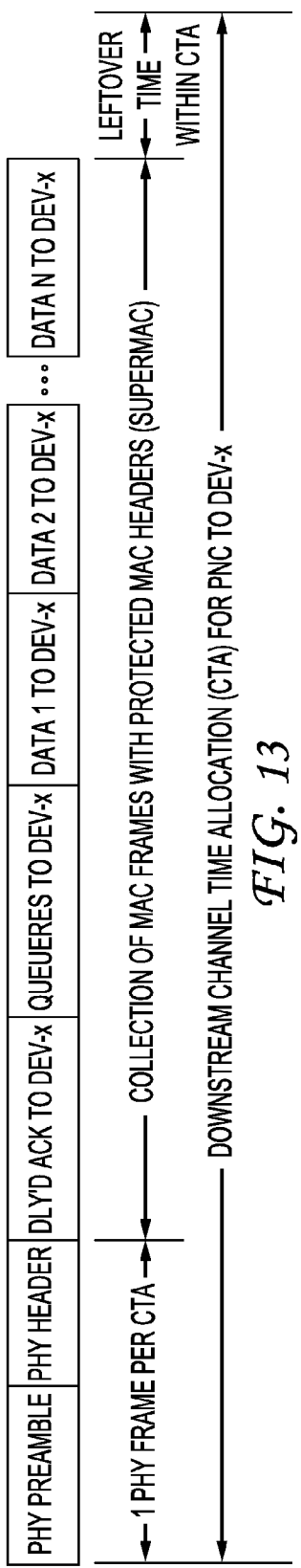
FIG. 13 depicts a single downstream CTA (PNC to DEV-x).
Figure 14:
FIG. 14 depicts SuperMAC frame (a non-standard aggregation of MAC Frames) and physical frame formatting.

The PNC receives Ethernet frames and constructs the Beacon and the frames for transmission to DEV1-DEV3 in CTA1-CTA3 as shown in FIG. 13, which shows one CTA. Once the CTA lengths have been determined, the PNC will construct SuperMac Frames (a non-standard aggregation of IEEE 802.15.3 MAC Frames) as shown in FIG. 14. They are constructed to fill the CTA including fragmentation of the last MAC Frame. This non-standard packing is an example of the frames sent within CTA1, 2, or 3. The SuperMAC frame is then forwarded to the PHY Layer for synchronous transmission. The CTAs start precisely at the times advertised in the beacon.

Referring to FIG. 13, the physical preamble and physical header make up one physical frame per CTA. Delayed ACK to a remote STB, queue status information request (QueueRes) to remote STB and multiple data packets to a remote STB make up a collection of MAC frames with protected MAC headers. The above concatenated with any leftover time within the CTA make up the downstream CTA for the PNC to a remote STB.

Note that the first and/or last MPDU placed into the CTA may consist of a fragment from the original MAC payload. Since the IEEE 802.15.3 MAC header contains information for fragmentation and reassembly, it should be understood that the methods described here can include fragmentation and reassembly without further explanation.

Referring now to FIG. 14, for each MAC payload there is a corresponding MAC header. The MAC header and the MAC payload are, however, separate. The MAC calculates a Frame Check Sequence (FCS) for detecting errors in the payload. However, instead of aggregating the MAC header with a single PHY header and calculating a Header Check Sequence (HCS) to protect the combined header as is done in standard IEEE 802.15.3, the method of the present invention calculates a Header Correction Code (HCC) to correct errors in each MAC header. The HCC is inserted after the MAC header and before the MAC payload. The MAC header contains important information regarding MAC payload, such as length. The length is needed to identify the starting place of the next MPDU. If that is lost, the rest of the MDPUs in the CTA will be lost. It is desirable to recover as many MDPUs as possible to keep the retransmission rate as low as possible, even if an error in the payload is detected later via the FCS.

The FCSL is calculated and inserted after the MAC payload. This is done for each MAC payload to create a Super-MAC frame. The SuperMAC frame length is part of the physical header, which is inserted ahead of the SuperMAC frame to make a CTA. The SuperMAC frame is forwarded to the PHY layer for synchronous transmission over the air. The physical header is transmitted at a slow reliable rate. The CTAs start at precisely the times advertised in the beacon. The SuperMAC portion of the CTA is transmitted at some desirable rate. The receiving MAC layer uses the MPDU headers and the HCCs to isolate each MPDU before checking for errors and converting to Ethernet frames.

Figure 15:
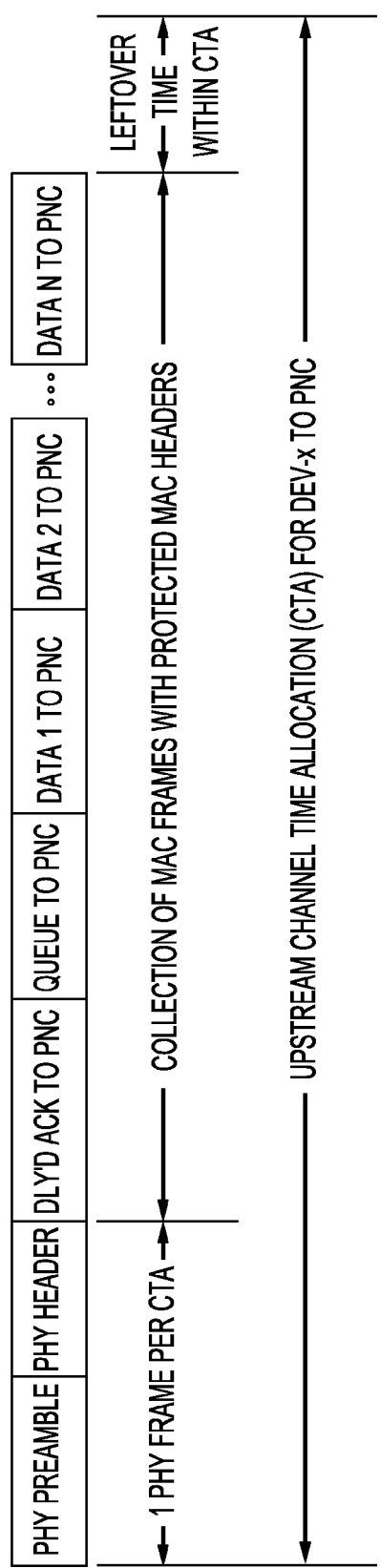
FIG. 15 depicts a single upstream CTA (DEV-x to PNC).

Transmission of frames within CTA 4, 5, & 6 are sent in a similar manner. An example of frames sent in one of those CTAs is shown in FIG. 15, which depicts a single upstream CTA (DEV-x to PNC), a single upstream CTA includes a physical frame and a collection of MAC frames with protected headers and any leftover time within the CTA. Like the downstream CTA depicted in FIG. 13 the physical frame includes the physical preamble and the physical header. The collection of MAC frames includes the delayed ACK to the PNC, the queue status information to the PNC and the data packets to the PNC. Note that this CTA includes a frame that carries queue status information back to the PNC. This queue status information may include the size of the queue (if that is variable), the number of frames in the queue, the average length of the frames, and the frame arrival rate at the input of the queue.

The present invention uses a fixed-length 5 msec or 10 msec superframe. For the case where the length of the superframe and CTAs are fixed, Table 1 shows some reasonable values. Table 2 shows the approximate number of packets expected within each CTA under some specific assumptions. However, as has been stated, the present system involves adapting the length of CTAs and possibly even the superframe length to minimize queue overflows and maximize the use of the time and therefore achieve a high efficiency.

TABLE 2

Approximate Number of Data Frames per CTA

| Superframe Length | CTA-1 Video Frames* | CTA-2 Video Frames | CTA-3 Video Frames | CTA-4 TCP ACKs+ | CTA-5 TCP ACKs | CTA-6 TCP ACKs |
|---|---|---|---|---|---|---|
| 5 msec. | 10# | 10 | 10 | 10 | 10 | 10 |
| 10 msec | 19# | 19 | 19 | 19 | 19 | 19 |

*For CTA-1,2,3 based on 1404-byte payload MAC Frames each with 1300 bytes of video data.
+For CTA-4,5,6 based on 40-byte MAC payload for TCP ACKs
Number of Frames per CTA chosen to meet bit rate requirements (i.e., ~20 Mbps per for video data)

Even though the description above has focused on a wireless bridging system with one master and three client devices suitable for a high definition video distribution application, it should be clear to those trained in the art that the methods can be extended to a general wireless TDMA MAC and even to wired TDMA MACs running on common media (e.g. powerline).

It is to be understood that the present invention may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed. Given the teachings herein, one of ordinary skill in the related art will be

TABLE 1

SuperMAC Frame Sizes and Recommended CTA Lengths

| Superframe Length | | 20 MHz, QPSK, ½ rate Beacon | Assumes 40 MHz, 16QAM, ⅚ rate coding | | | Assumes 40 MHz, 16QAM, ⅚ rate coding | | | Leftover+ |
|---|---|---|---|---|---|---|---|---|---|
| | | | CTA-1 | CTA-2 | CTA-3 | CTA-4 | CTA-5 | CTA-6 | |
| 5 msec | Frame Lengths* | 100 usec | 1.3 msec | 1.3 msec | 1.3 msec | 96 usec | 96 usec | 96 usec | |
| | Recommended Allocated Time+# | 116 usec | 1.4 msec | 1.4 msec | 1.4 msec | 228 usec | 228 usec | 228 usec | 0 usec |
| 10 msec | Frame Lengths* | 100 usec | 2.44 msec | 2.44 msec | 2.44 msec | 136 usec | 136 usec | 136 usec | |
| | Recommended Allocated Time+# | 116 usec | 3.0 msec | 3.0 msec | 3.0 msec | 240 usec | 240 usec | 240 usec | 160 usec |

*For CTA-1,2,3 based on 1404-byte payload MAC Frames each with 1300 bytes of video data. For CTA-4,5,6 based on 40-byte MAC payload for TCP ACKs
+Each Frame must be followed by a 16 usec SIFS.
CTA-4, 5, 6 sized to accommodate at least 1 full size frame to avoid fragmentation

The invention claimed is:

1. A method for creating a multi-media stream SuperMAC frame in a physical protocol data unit using a time division multiple access (TDMA) Media Access Control (MAC) layer, said method comprising:
   generating said multi-media stream SuperMAC frame including at least two individual IEEE 802.15.3b MAC frames, said generating act further comprising:
   a) inserting a physical layer header into an assigned channel time allocation of said TDMA MAC layer, wherein a length of said channel time allocation is varied according to a MAC bandwidth management command about a queue length for a previous transmission at a remote device;
   b) retrieving a multi-media Ethernet frame from a transmit queue;
   c) converting said multi-media Ethernet frame to an IEEE 802.15.3b MAC frame, wherein said converting includes:
      d) appending an IEEE 802.15.3b MAC header to said SuperMAC frame the IEEE 802.15.3b MAC header containing a length of a multi-media stream payload;
      e) calculating a header correction code used to correct errors in the IEEE 802.15.3b MAC header;
      f) appending said header correction code to said IEEE 802.15.3b MAC header;
      g) appending a multi-media stream payload from the Ethernet frame to said header correction code;
      h) calculating a frame check sequence code used to detect errors in the multi-media stream payload; and
      i) appending said frame check sequence to said multi-media stream payload;
   repeating steps b) through i) until one of said channel time allocation is full or the transmit queue is empty, wherein said repeating act is executed at least once, and wherein each IEEE 802.15.3b MAC header is associated with one header correction code and each multi-media stream payload is associated with one frame check sequence; and
   sending the multi-media stream SuperMAC frame to a receiving device.

2. The method according to claim 1, further comprising transmitting said physical layer header at a first predetermined rate.

3. The method according to claim 2, further comprising transmitting said SuperMAC frame at a second predetermined rate.

4. The method according to claim 1, wherein said physical layer header includes a length of said SuperMAC frame.

5. A method for decoding a received multi-media stream SuperMAC frame, said method comprising:
   a) receiving a multi-media stream SuperMAC frame by a remote device, the multi-media stream SuperMAC frame including at least two individual IEEE 802.15.3b Media Access Control (MAC) frames;
   b) isolating a media access control header of an IEEE 802.15.3b MAC frame from said multi-media stream SuperMAC frame carried in an assigned channel time allocation of a time division multiple access (TDMA) MAC layer, and a length of said channel time allocation is varied according to a MAC bandwidth management command about a queue length for a previous transmission at the remote device;
   c) isolating a header correction code of the IEEE 802.15.3b MAC frame;
   d) checking for and correcting errors in said media access control header using the header correction code;
   e) determining a boundary for a unit of multi-media stream payload within said multi-media stream SuperMAC frame using payload length information within the media access control header of the IEEE 802.15.3b MAC frame;
   f) detecting errors in the multi-media stream payload of the IEEE 802.15.3b MAC frame using a frame control sequence of the IEEE 802.15.3b MAC frame;
   g) converting the IEEE 802.15.3b MAC frame into a multi-media Ethernet frame by inserting the multi-media stream payload, the frame control sequence and a priority mapping into a multi-media Ethernet frame;
   repeating steps b) through g) until the multi-media stream payloads of all of the at least two individual IEEE 802.15.3b MAC frames have been recovered from said multi-media stream SuperMAC frame, wherein said repeating act is executed at least once; and
   outputting each of the multi-media stream payloads by the remote device.

* * * * *